United States Patent [19]

Chavannes

[11] 4,232,074
[45] Nov. 4, 1980

[54] REINFORCED PAPER PRODUCT AND METHOD FOR THE MANUFACTURING THEREOF

[76] Inventor: Marc A. Chavannes, 4044 Roberts Point, Sarasota, Fla. 33581

[21] Appl. No.: 878,158

[22] Filed: Feb. 15, 1978

Related U.S. Application Data

[63] Continuation-in-part of Ser. No. 599,142, Jul. 25, 1975.

[51] Int. Cl.² ............... B32B 3/28; B32B 5/10
[52] U.S. Cl. ............... 428/110; 156/179; 156/206; 156/210; 156/265; 156/300; 428/114; 428/182; 428/191; 428/192; 428/211
[58] Field of Search ............. 156/176, 178, 179, 205, 156/293, 206, 298, 300, 301, 257, 260, 265, 554, 555, 519, 271, 436; 428/110, 114, 166, 167, 182, 191, 211, 291, 107, 113, 192, 194, 295, 296

[56] References Cited

U.S. PATENT DOCUMENTS

| | | | |
|---|---|---|---|
| 958,450 | 5/1910 | Wardell | 428/182 |
| 2,739,092 | 3/1956 | Stevenson | 156/179 |
| 2,780,572 | 2/1957 | Carlson | 156/178 |
| 3,031,356 | 4/1962 | Bousquet et al. | 156/202 |
| 3,364,094 | 1/1968 | Rosler | 156/440 |
| 3,809,593 | 5/1974 | Burke et al. | 156/260 |

FOREIGN PATENT DOCUMENTS

187005 4/1905 Fed. Rep. of Germany ......... 428/184

OTHER PUBLICATIONS

Kellicutt, "How Liner/Medium Weight Relationships Affect the Strength of Corrugated", Boxboard Containers, Mar. 1972, pp. 51-56.

*Primary Examiner*—Michael W. Ball
*Attorney, Agent, or Firm*—Lerner, David, Littenberg & Samuel

[57] ABSTRACT

Improved wire reinforced paper products are disclosed in which a plurality of parallel spaced wires serve to strengthen and reinforce the paper structure. The improved paper structure includes a first paper layer having a plurality of parallel spaced channels formed on the surface of one face, a plurality of wires, and a second paper layer. The spaced channels are of a depth less than the thickness of the first paper layer. The plurality of wires are set in the channels of the first paper layer, and the second paper layer is adhesively secured to the surface of the first paper layer which has the channels formed thereon to firmly hold the plurality of wires in place. A method of manufacturing such wire reinforced paper products is also disclosed.

38 Claims, 28 Drawing Figures

REINFORCED PAPER PRODUCT AND METHOD FOR THE MANUFACTURING THEREOF

This is a continuation-in-part of copending Application Ser. No. 599,142 filed July 25, 1975.

FIELD OF THE INVENTION

The present invention relates to reinforced paper products and corrugated board, and more particularly, to wire reinforced paper products and corrugated board.

BACKGROUND OF THE INVENTION

While it is well known to utilize reinforcing elements including various types of fibers to provide increased strength in paper products, the known fibrous materials do not impart much in the way of structural strength, nor do they add much rigidity and stiffness to the finished product. In the case of corrugated board, which is made with various weights of paper, increased stiffness and strength have been obtained by increasing the weight of the paper utilized for both the corrugated central medium as well as the overlying layers or facings. In fact, when heavy packing cases were to be made of corrugated board, several layers of corrugated board had to be laminated in order to obtain the desired stiffness and strength. It is well known that corrugated board has been manufactured for many decades, yet the only procedures that have been considered economical and practical to obtain increased structural strength and stiffness have involved the use of paper of increased weight, and the lamination of layers of corrugated board. It is well recognized however that notwithstanding the utilization of heavier paper, and also the lamination of corrugated board that the resulting product is still subject to adverse effects of moisture which results in substantial softening of the board and loss of the protection intended to be afforded by it. Furthermore, to waterproof the resulting cardboard structure to eliminate the adverse effects of moisture it has thus far been necessary to wax the cardboard or to cover the interior of the cardboard with a polyurethane film.

In copending Application Ser. No. 599,142, filed July 25, 1975, for "Reinforced Paper Products and Method and Apparatus for the Manufacturing Thereof," there is disclosed an improved wire reinforced corrugated board and other products in which the corrugated medium for corrugated board is comprised of a plurality of wires adhered in firm contact to a paper web which is then corrugated transversely of the wires so that the wires and the paper conform to one another. This corrugated medium then has outer paper layers or liners adhered to the crest portions of each side of the corrugating medium to form a double faced wire reinforced corrugated board. The plurality of wire elements in the corrugating medium provide improved rigidity and strength for the resulting corrugated board. In particular, the compressive or bending forces applied to the corrugated board are greatly increased as a result of the triangular truss structure formed by the wire elements in the corrugating medium of a double-faced cardboard construction. That is, when compressive or bending forces are applied to the cardboard, the wire legs are placed into compression which is one of the strengths of wire. Thus, the structure will support substantial compressive forces.

In that copending application, the wires were adhered onto the surface of a single paper web before corrugation. Further, an overlying paper web could be adhered on top of the wires so that the wires were completely enclosed in a paper structure. Due to the thinness of the paper webs and the thickness of the wires positioned therebetween, and to the fact that it is desired that the two paper webs be adhered to one another, a series of ridges were produced on at least one of the outer surfaces of the paper structure. It may be desired, for a variety of reasons, to eliminate these ridges. For example, a smooth outer surface would both be aesthetically pleasing as well as easier to be adhered to. Further, as can be appreciated, when wires are only placed on the surface between the two layers, great care is necessary to insure that the two paper webs are securely adhered together.

SUMMARY OF THE INVENTION

According to the present invention, there is provided a wire reinforced paper structure in which a plurality of wires are disposed in spaced parallel channels or trenches formed on one surface of a first paper layer. The channels are of a depth which is less than the thickness of the first paper layer and a second paper layer is adhesively secured to the surface of the first lyaer having the channels formed thereon. In this way, the wires set in the channels are tightly held in place between the two paper layers. This improved wire reinforced paper structure may then be corrugated to form the corrugated medium of a double-faced corrugated board in which outer paper facings or liners are adhesively secured to the crest portions of opposite sides of the corrugated medium.

The resulting wire reinforced paper structure has an equal thickness across its entire width and the wires are tightly held in position in the trenches or channels between the two outer paper layers. Both of these bottom and top surfaces of the paper structure are smooth and flat. Further, the adhesion both between the faces of the individual paper layers laminated together as well as the adhesion to other materials and surfaces is good. This in turn permits a reduction in the amount of glue or adhesive required for adhering the surfaces together, and permits the corrugating machine to be run at a higher speed. Further, there is the advantage that better printing can be done on the new smoother surface of the resulting paper structure.

In the preferred embodiment, the first paper layer is formed from two separate paper plys or webs laminated together. One of the two paper webs is cut to form a series of longitudinal spaced strips having open spaces therebetween. These strips are then adhesively secured to the other web with the spacing between the strips maintained to provide the series of spaced parallel channels for the wires.

In the method of the present invention, a middle web of paper is cut to provide a series of spaced openings through the paper web. This cut middle paper web having the spaced openings is then adhesively secured to a first outer paper web, the spaced openings defining a series of spaced parallel channels. A series of longitudinal extending wires are then fed into the channels, and a second outer paper web is adhesively secured to the cut middle paper web to securely hold the wires in place between the two outer layers.

In a still further preferred embodiment, the middle paper web, which is to be cut to define the channels for the reinforcing wires, is initially cut to form a series of spaced strips and the strips are fed in overlying relationship onto another paper web being passed over a drum. This other paper web has an adhesive coating applied to its surface away from the drum so that the strips fed onto the web are adhered thereto. In an alternative embodiment, the middle paper web is initially passed onto a drum where it is then cut and the first overlying paper web having an adhesive coating on one surface, is then fed in adhesive securing relationship onto the cut middle paper web on the drum.

According to still another aspect of the present invention a completely waterproofed cardboard structre is achieved by using a water resistant composition as the adhesive to secure together the three individual paper layers which comprise the laminated paper structure. The water resistant adhesive (which may for example be a rubber latex composition) is applied between each of the outer paper layers and the middle paper layer, thereby serving to completely enclose the middle paper layer (with the exception of the exposed edges of the reuslting laminate) with a waterproof material. Thus, moisture is unable to permeate through the rubber latex composition and adversely affect the middle paper layer. Also, the open edges of the resulting web may be taped with a water resistant tape to complete the waterproofing of the laminated cardboard structure.

These and other features, advantages and characteristics of the present invention will be apparent from the following detailed description of the preferred embodiments of the present invention in which reference is made to the accompanying drawings.

DETAILED DESCRIPTION OF THE PRESENT INVENTION

In the aforementioned copending Application Ser. No. 599,142, filed July 25, 1975, there is disclosed an improved reinforced paper product in which the corrugating medium of a corrugated cardboard is formed from a paper structure having a plurality of parallel spaced wires adhesively secured thereto and corrugated transversely of the wires. As set forth in that copending application, the wire reinforcing elements serve to materially increase the strength of the paper and corrugated board, not only by reason of the wire itself, but because of the configuration of the resultant laminate embodying the wire elements, i.e. the triangular truss structure formed by the wire elements. Further, it was stated that the utilization of the wire reinforcing elements in corrugated board in the manner disclosed in that application made it possible to obtain as much as three times the structural strength utilizing only a moderate weight paper with a 10 mil wire at ¼" wire spacing than was otherwise obtainable by the strongest corrugated board available at that time. It is to be noted that this increased structural strength was with respect to compression and/or bending of corrugated board.

The improved wire reinforced structure in accordance with the present invention is both in furtherance of and in addition to the teachings of that copending application. In particular, according to the present invention, there is provided an improved paper structure in which the wire reinforcing elements are more firmly and rigidly held in place. Accordingly, the improved wire reinforced paper structure forms an improved corrugated wire reinforced board when the improved paper structure is corrugated and used as the corrugating medium. Further, and also in accordance with the present invention, there is provided an improved method for manufacturing the improved wire reinforced paper structure in order to provide a smoother flat paper structure over that disclosed in the aforementioned copending application. In particular, the wire reinforcing elements in accordance with the present invention are positively fed into channels provided in the laminate paper structure and are firmly held in place thereat between the overlying paper webs. As with the wire reinforcing elements of the copending application, the spacing between such wire elements in the paper structure may be almost any desired spacing but is preferably on the order of ⅛" to ¼". Further, the wire reinforcing elements are preferably on the order of 5–25 mils thickness, and most preferably 10–15 mils.

Figure 4:
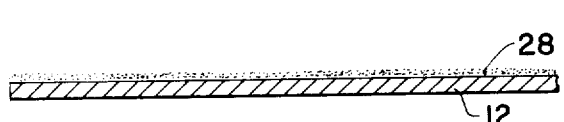
FIG. 4 is a cross-sectional view taken along lines 4—4 of FIG. 1 showing one of the outer paper webs with adhesive applied thereto.
Figure 5:
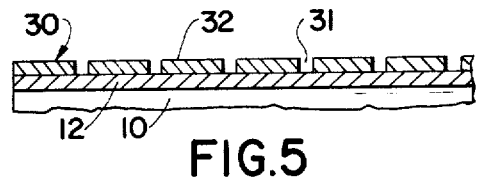
FIG. 5 is a cross-sectional view taken along lines 5—5 of FIG. 1 showing the middle paper web adhesively secured to an outer paper web.
Figure 6:
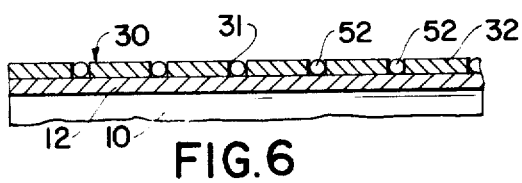
FIG. 6 is a cross-sectional view taken along lines 6—6 of FIG. 1, similar to that shown in FIG. 5 but with the wires positioned in the channels formed in the middle paper web.

With the above in mind, it will become apparent from the following description that various procedures may be utilized in the formation of the improved reinforced paper product of the present invention. In particular, the initial step in the formation of any such products involves the formation of a plurality of spaced parallel channels for the placement of wires therein. One such procedure and apparatus for accomplishing the same is illustrated diagramatically in FIG. 1. In this figure, a single drum 10 is provided on which the entire lamination process is accomplished to produce or manufacture the improved paper structure in accordance with the present invention. The drum 10 includes suitable means (not shown) for heating it in order to dry and/or cure the adhesive which is applied to the paper webs. For example, the heat may come from steam, hot oil or other liquids. Initially, a paper web 12 is fed from a roll 14 about rollers 16, 18 and 20 onto the surface of the drum 10. An adhesive 28 contained in a trough 22 is applied by means of rollers 24, 26 to the surface of the paper web 12. The adhesive is preferably applied over the entire area of the web 12, as can be seen in FIG. 4, but may instead just be applied in strips which correspond to the strips of paper to be adhered to web 12, as described below.

Figure 1:
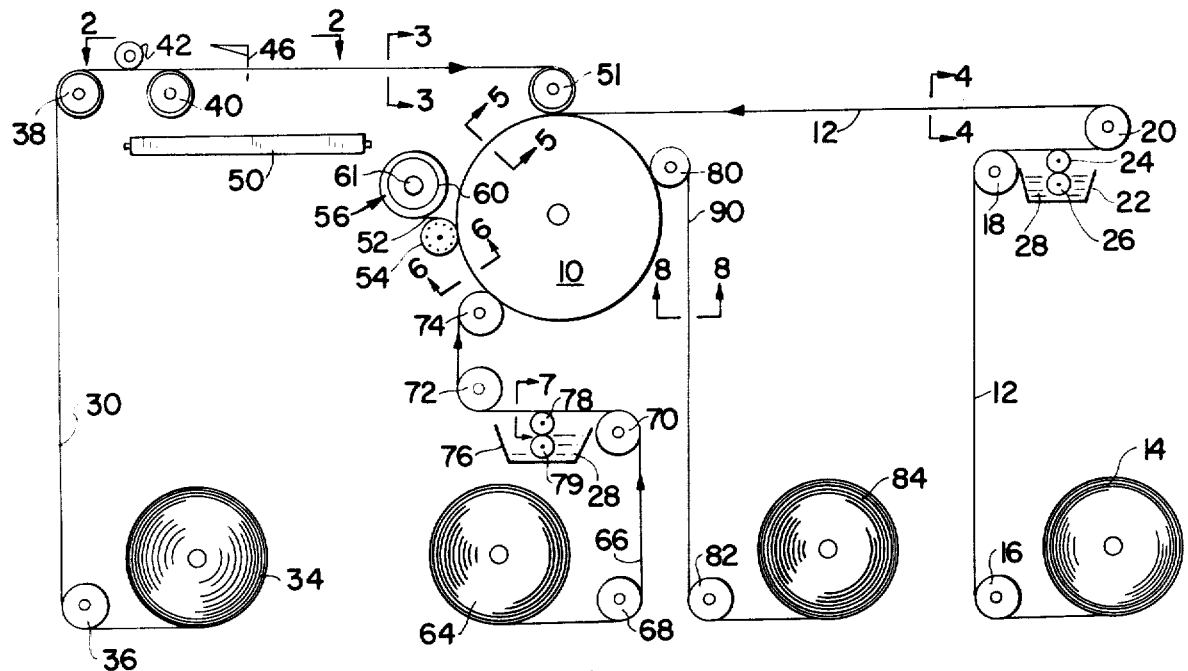
FIG. 1 is a diagramatic view of the apparatus for manufacturing a wire reinforced paper structure in accordance with the present invention.
Figure 2:
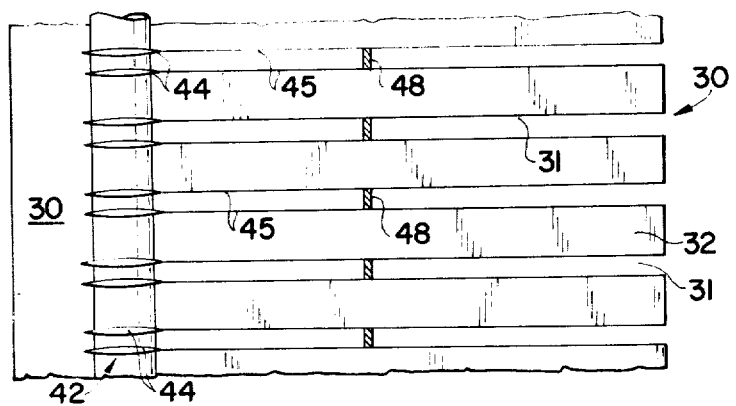
FIG. 2 is a plan view taken along line 2—2 of FIG. 1, illustrating the cutting of the middle paper web to produce the series of channels for the wires in accordance with the present invention.

Also fed onto the drum 10 and onto the adhesively coated surface of the web 12 is a second paper web 30 which has been cut to provide a plurality of spaced strips. Web 30 is fed from a roll 34 about idler rollers 36, 38 and 40. A cutting drum 42, having a plurality of spaced peripheral cutting knives or blades 44 about the circumference thereof serves to make a plurality of cuts 45 completely through the paper web 30. During this cutting operation, rollers 38 and 40 serve to hold the web 30 level. A steel comb or other device 46 having a plurality of fine teeth 48 is positioned behind the cutting roller 42. As best seen in FIGS. 1 and 2, the teeth 48 of the comb 46 pass through the paper web 30 and act to deflect and remove the threads of paper cut from the web 30 so as to provide a series of open spaces or notches 31 in the web 30. These scraps of paper which are removed fall onto a carrier mechanism 50 positioned below the passing web 30. As can be seen in FIG. 2, the width of the teeth 48 corresponds substantially to the width of the open channel 31 cut in the web 30, and the spacing between the teeth 48 corresponds to the spacing of adjacent pairs of cutting blades 44 of the cutter 42. This spacing in turn corresponds to the desired spacing of the wires to be inserted in the channels formed in the web 30, to be described below.

Figure 3:
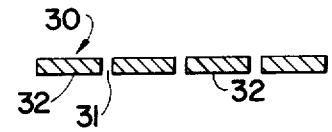
FIG. 3 is a cross-sectional view taken along lines 3—3 of FIG. 1 showing the cut middle paper web.

The paper web 30 with the cut threads removed, as seen in FIG. 3, consists of a plurality of spaced bands or strips 32. The spacing 31 between adjacent strips 32 corresponds to the thickness of the wire to be disposed therebetween. Likewise, the thickness of the paper web 30 and thus, the thickness of the individual bands 32 also preferably corresponds to the thickness of the wires to be inserted in the channel 31.

The strips of bands 32 are fed about pressure roller 51 onto the adhesively coated side of the outer paper web 12 and onto the heated drum 10. The pressure roller 51 may be provided with a rubber or other resilient surface to urge the bands 32 into firm contact with the outer or bottom paper layer 12. The roller 10 includes suitable means for heating it in order to dry the adhesive on the bottom layer 12 to secure the strips 32 in place. Of course, additional heating elements (not shown) may also be employed to accelerate the drying or curing process as the webs 12 and 30 are passed about the roller 10, in a well know manner.

Figure 9:
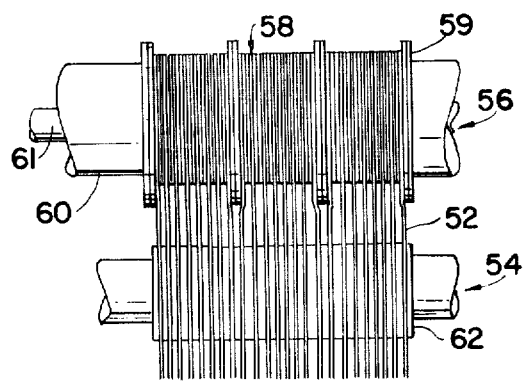
FIG. 9 is a plan view of the spool and guide arrangement utilized in the apparatus of FIG. 1 for guiding of the plurality of wires in parallel relationship into the series of channels formed in the middle paper web.

As the web 12, with the bands 32 of the middle web 30 adhered thereto, is fed about the drum 10 a plurality of wires 52 are fed into the channels 31. This is accomplished by means of a guide roller 54 which guides the plurality of wires 52 delivered by a spooling arrangement 56. Preferably, this spooling arrangment 56 comprises a plurality or battery of individual spools 58 mounted on a common cylinder 60. The common cylinder 60 in turn is mounted on an axle 61 for rotation. As best seen in FIG. 9, the individual spools 58 each hold a plurality of wires 52 which have been wound therein in compact relationship in order to provide the desired spacing for the wires to be guided into the channels 31. For instance, if a ¼ inch spacing between the wires 52 is desired in the finished product, each of the individual spools 58 could be loaded or charged with, for example, eight wires 52 wound between the flanges 59 of the spools 58. For this ¼ inch spacing, the flanges 59 would be on the order of 2 inches apart. By using this arrangement, it is possible to use a battery of wire extruding machines which run at a very high speed, for example, on the order of 2,000 feet per minute, to charge each of the individual spools 58. That is, a battery of eight extruders running side by side could deliver eight wires at one time to charge a spool 58. the charged spool 58 is then mounted and keyed on the common cylinder 60. Further, use of spools 58 to hold a plurality of wires 52 minimizes the number of flanges 59 for the spooling arrangement 56. This is desirable since, as can be appreciated, each flange takes up a relatively large space when compared to the wires 52.

The wires 52 from the individual spools 58 are then guided between appropriate spaced peripheral flanges 62 of the guide roller 54 to guide the wires 52 precisely into the channels 31 on the webs 30 and 12 laminated together. As shown in FIG. 1, the spooling arrangement 56 rotates in a counterclockwise manner while the guide roller 54 rotates in a clockwise manner. The flanges 62 are of appropriate thickness and spacing so that a fine guiding arrangement is achieved. For this purpose, the spacing between individual flanges 62 corresponds approximately to the thickness of the wires 52 and the thickness of the individual flanges corresponds to the width of the individual strips of paper 32.

As noted previously, the thickness of the web 30 corresponds to the thickness of the wires 52 to be placed in the channels 31. Similarly, the spacing between the individual strips 32 (i.e., the width of the channels 31) also corresponds to the thickness of the wires 52 so that the wires 52 are somewhat rigidly supported in position when they are fed into the channels 31.

Figure 7:
FIG. 7 is a cross-sectional view taken along lines 7—7 of FIG. 1, showing the other outer paper web with adhesive applied thereto.
Figure 8:
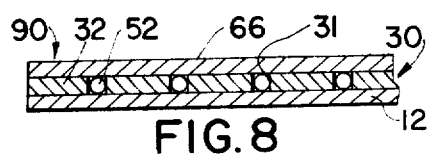
FIG. 8 is a cross-sectional view taken along lines 8—8 of FIG. 1, showing the wire reinforced paper structure of the present invention.

After the wires 52 are fed into the channels 31, a second paper web 66 is adhesively secured to the laminated webs 30 and 12 to entrap the wires 52 therebetween. The web 66 is fed from a roll 64 about idler rollers 68, 70 and 72 and pressure roller 74 onto the heated drum 10 in overlying relationship with respect to the bands 32 and wires 52. An adhesive 28, contained in trough 76, is applied by means of rollers 78, 79 to one side of web 66 in a manner similar to the adhesive applied to one surface of the web 12 (see FIG. 7). The pressure roller 74, as with pressure roller 51, may be provided with a rubber or resilient surface and maintained under pressure against the drum 10 in order that the web 66 is sealed and secured to the cut middle paper layer 30 (already adhesively secured to the lower web 12). This resulting laminated paper structure 90 is fed from drum 10 about rollers 80 and 82 and then onto a rewind or take-up drum 84. As noted above, the drum 10 is heated so as to dry and/or cure the adhesive applied to the various webs 12, 66. Alternatively, or in addition to heating drum 10, the wire reinforced laminated 90, before being wound on drum 84, could be passed through an oven heating means (not shown) to insure complete drying and/or curing. The laminated wire reinforced paper structure 90 wound on drum 84 may then be used for any desired purpose, such as forming a corrugated medium of double-face corrugated board as described in copending application Ser. No. 599,142 and as further described hereinbelow.

As can be appreciated, the resulting wire reinforced laminated structure 90 has the wires 52 tightly held in place in the channels 31 formed in the middle layer 30 and covered by the top and bottom layers 12 and 66. In this regard, it is to be noted that the channels 31 which receive the wires 52 have a cross-sectional area which is greater than the cross-sectional area of the wires 52 disposed therein. Further, the finished product 90 has smooth flat surfaces. This is aesthetically pleasing as well as functional in that the resulting laminate structure 90 may be readily adhered to the fullest extent possible to other materials for whatever desired purpose. Further still, the wires 52 will be firmly retained in place during any cutting operation or during corrugation, to be described hereinbelow. This in turn minimizes the risk of the wires 52 becoming exposed during further operations and causing damage and/or injury.

Figure 10:
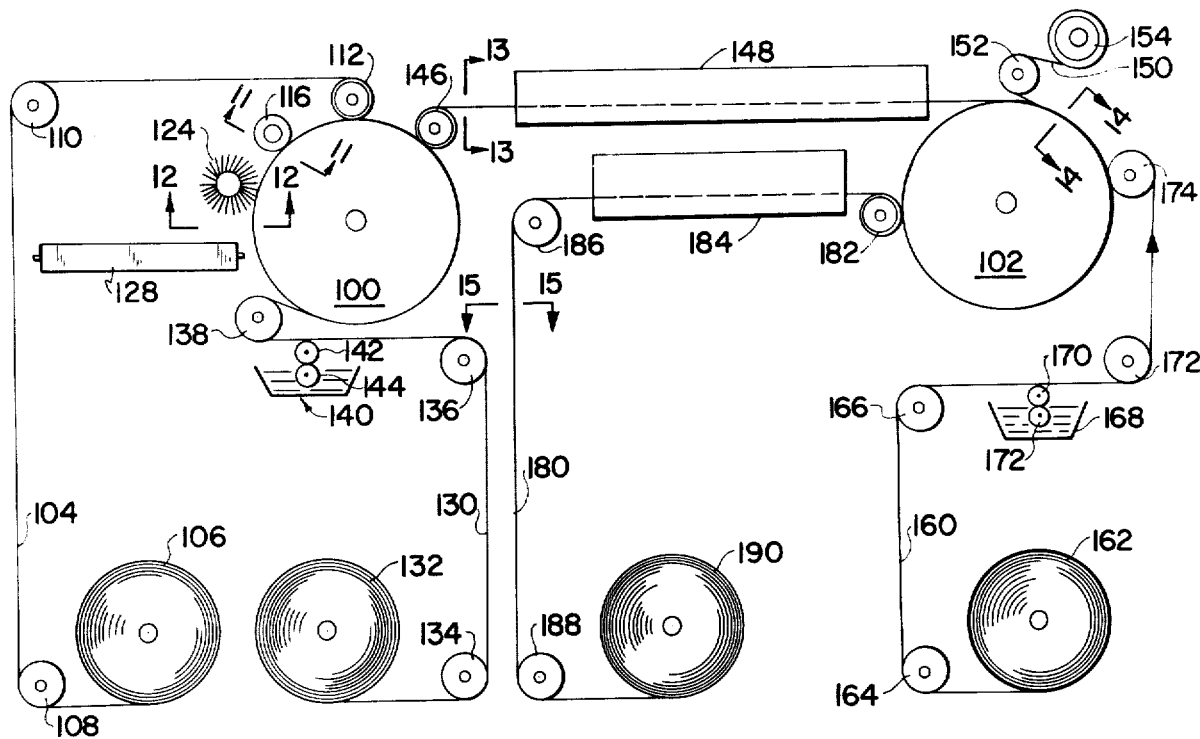
FIG. 10 is a diagramatic view of another embodiment of the apparatus for manufacturing another embodiment of wire reinforced paper structure in accordance with the present invention.

FIG. 10 shows an alternative apparatus for producing a wire reinforced paper structure according to the present invention. In addition, the apparatus of FIG. 10 is arranged so as to produce an alternative embodiment of the present invention. In this embodiment a double width channel is cut in the middle paper web for the placement of a pair of wire reinforcing elements in each of the channels so formed. In other words, the width of the channels in the middle layer will be at least twice the thickness of the wire to allow two wires to be inserted into each channel instead of just one. In this way an article with twice the strength may be achieved without having to increase the thickness of the resulting paper structure. That is, two wires each of a given thickness, say 10 mils, may be inserted in each channel instead of a single 20 mil thickness wire being placed in the channel which in turn would require that the thickness of the middle layer would be increased to 20 mils.

In this embodiment shown in FIG. 10, two heated drums 100, 102 are used for adhering the paper layers to one another. Again, suitable means (not shown) supply the heat in the drums 100 and 102. Initially, a paper web 104 is fed from roll 106 about idler rollers 108 and 110 and pressure roller 112 onto the surface of drum 100. The idler rollers 108, 110 serve to maintain the tension in the paper web 104 to insure an even feeding onto the drum 100. Further, pressure roller 112 is preferably provided with a rubber or other similar face so that pressure can be applied thereby to hold the paper web 104 and prevent slippage thereof with respect to the drum 100. This web 104 will become the middle web of the improved wire reinforced paper laminate of the present invention.

Figure 11:
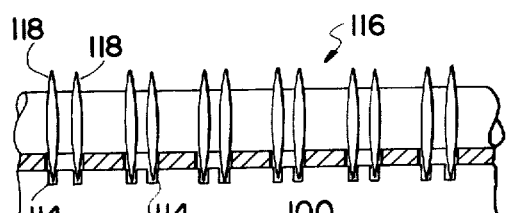
FIG. 11 is a cross-sectional view taken along lines 11—11 of FIG. 10 showing the cutting mechanism for cutting the middle paper web to produce a series of channels.

Referring to FIG. 11, drum 100 is provided with a series of circumferential grooves 114 in its outer surface which are adapted to receive the cutting blades or knives 118 of a cutting roller 116. As noted above, a double width channel is to be cut in the middle layer 104. Thus, the spacing between the individual blades 118 of the cutting roller 116 is such as to produce the desired width of the channel, as well as to produce the desired spacing between channels.

Figure 12:
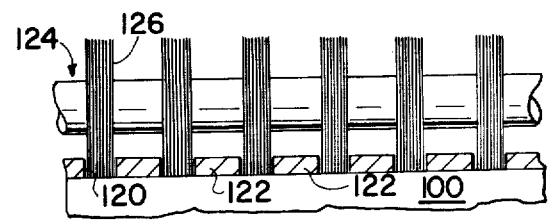
FIG. 12 is a cross-sectional view taken along lines 12—12 of FIG. 10 showing the brushes in accordance with the present invention for cleaning the threads of cut paper from the middle paper web.
Figure 13:
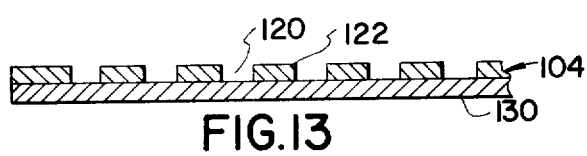
FIG. 13 is a cross-sectional view taken along lines 13—13 of FIG. 10, showing the cut middle paper web adhesively secured to an outer paper web.
Figure 14:
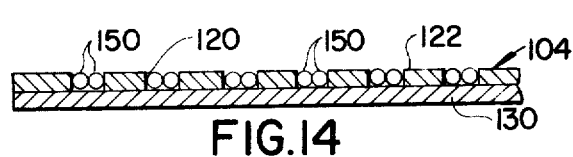
FIG. 14 is a cross-sectional view taken along lines 14—14 of FIG. 10, showing two wires placed in each of the channels formed in the middle paper web adhered to an outer paper web.

A rotating brush assembly 124 is provided adjacent to the cutting roller 116 to clean out from the surface of the drum 100 and from the web 104 itself the narrow threads of paper, thereby leaving a plurality of spaced strips or bands 122. Channels 120 are thus defined between the strips 122. As seen in FIG. 12, the brush assembly 124 comprises of a plurality of individual brush elements 126 which are each approximately the width of the channels 120 cut in the middle web 104. The brush assembly 124 is rotated clockwise at a greater speed than the drum 100 so that the cut paper threads will be thrown outwardly tangentially from the drum 100 and onto a carrier 128 which may be a conveyor to take the waste out of the room in which the machine is located.

A second paper web 130, which is to become one of the outer paper plys or layers of the improved paper structure, is fed from a roll 132 about idler rollers 134 and 136 to a gluing station 140 where adhesive is applied to one surface of the web 130 by means of rollers 142, 144. From there, the web 130 is fed about another idler roller 138 which maintains the desired tension on the web 130 and onto the heated drum 100 in overlying relationship over the middle paper layer 104 which, at this location, is comprised of a plurality of strips 122.

A pressure roller 146 is preferably provided with a rubber or similar face and is maintained in pressure contact with the drum 100 in order that pressure is applied to hold the two paper layers 104, 130 in adhesively sealing relationship and to avoid slippage therebetween. The laminated paper structure on drum 100 is then fed about the pressure roller 146 and passed through an oven 148 which is heated with hot air to evaporate the greatest part of the water or solvent remaining in the adhesive or in the paper laminate. The use of a heating oven is another arrangement for aiding in drying and/or curing of the adhesive, and in the embodiment shown in FIG. 10, is in addition to heated drum 100. Further, it is to be noted that the oven 148 need not remove all of the moisture in the paper laminate as any excess moisture in the medium will evaporate in the heating ovens of the corrugating machine to be described hereinbelow.

Figure 16:
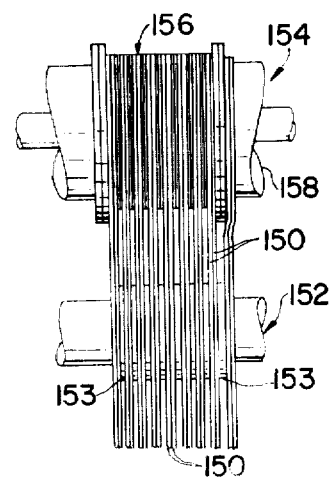
FIG. 16 is a plan view of the spool and guide arrangement utilized in the apparatus of FIG. 10, for guiding of the plurality of wires in parallel relationship into the series of channels formed in the middle paper web.

From the oven 148, the laminated two layers 104, 130 are fed about a second heated drum 102 wherein individual wires 150 are fed from a spool arrangement 154 about a guide arrangement 152 precisely into the channels 120 provided between the strips 122 of the middle paper layer 104. This spool arrangement 154 and guide arrangement 152 are each similar to those described with respect to the apparatus of FIG. 1 except that they are adapted to feed a pair of wires 150 into each of the channels 120. As best seen in FIG. 16, the spooling arrangement 154 comprises a plurality of individual spools 156 mounted and keyed on a common cylinder 158. The individual spools 156 are each charged or loaded with a plurality of wires 150, in this instance 16. For ¼" spacing between channels 120, the individual spools 156 would each be approximately 2 inches wide as two wires 150 are to be set in each channel 120. The guide arrangement 152, like the guide arrangement of FIG. 1, comprises a guide roller with a plurality of spaced peripheral flanges 153. The spacing between the guide flanges 153 corresponds to the width of the channels 120 (i.e., twice the thickness of a wire 150) and the thickness of the flanges 153 corresponds to the width of the bands or strips 122.

A second overlying paper web 160 is fed from a roll 162 about idler rollers 164 and 166 to a gluing station 168 where adhesive is applied to one side by means of rollers 170, 171. The adhesively coated web 160 is then fed about idler rollers 172, 174 onto the heated drum 102 and into overlying relationship on the middle paper web 104 having the wires 150 placed therein to complete the wire reinforced laminated structure 180. The laminate of the three paper webs 104, 130 and 160 is then taken from the heated drum 102 about pressure roller 182. The pressure roller 182, like rollers 112, 146 is preferably provided with a rubber or similar face so that pressure can be applied against drum 102 to prevent slippage of the paper webs 104, 130 and 160 with respect to one another and with respect to drum 102.

From roller 182, the laminate 180 is passed through an oven 184 which serves the same function as oven 148—namely, to evaporate the greatest part of the water or solvent remaining in the adhesive or in the paper laminate 180. The resulting laminate structure 180 is then passed about idler rollers 186, and 188 and fed onto a take-up drum 190.

Figure 15:
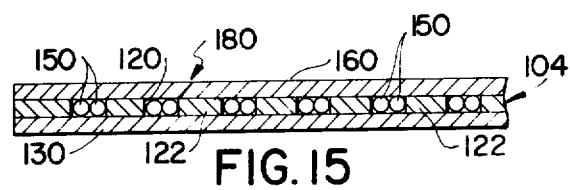
FIG. 15 is a cross-sectional view taken along lines 15—15 of FIG. 10, showing another embodiment of the wire reinforced paper structure in accordance with the present invention.

As best seen in FIG. 15, the resulting wire reinforced paper structure 180 is one in which pairs of wire reinforcing elements 150 are set in channels 120 formed in the middle paper web 104. The upper and lower outer plys or layers 130, 160 as well as the band 122 of the middle web 104 serve to completely enclose and entrap the wires 150 so that they are maintained in a relatively rigid position.

In the embodiments of the invention described in FIGS. 1–16, various types of adhesives may be employed depending on the characteristics desired in the completed product. One form of adhesive which has been found useful involves a mixture of vinyl and starch. Such a product is manufactured by National Starch and Chemical Corporation and comprises an aqueous solution containing VINAMYL, a chemical modification of starch, CROSREZ, a catalyst, and DURABOND, a chemically modified starch. VINAMYL, CROSREZ and DURABOND are trademarks of the National Starch and Chemical Corporation and one composition may be formed as follows:

| Primary Mixer | | | |
|---|---|---|---|
| A | Tap Water | 100 | gals. |
| B | Vinamyl | 400 | lbs. |
| C | Heat to 130° F. | | |
| D | Caustic Soda (dissolved in 5 gallons of water) | 32 | lbs. |
| E | Tap Water | 100 | gals. |
| Secondary Mixer | | | |
| A | Tap Water (heated to 85° F.) | 320 | gals. |
| B | Crosrez | 100 | lbs. |
| C | Borax (10 mol) | 30 | lbs. |
| D | Durabond | 1400 | lbs. |

Then intermix the primary mix into the secondary mix.

The adhesive becomes highly resistant to water after being dried and cured and has the advantage that it will tend to swell during the curing process and thus will completely fill all interstices that may exist between the webs and the wire reinforcing elements disposed therebetween in the channels and firmly adhere the webs and wires together. Other types of adhesives may also be utilized such as the caseins, hot melts, such as mixtures of resin and wax, and pressure sensitive adhesives which may also include additives to impart a thermosetting quality thereto.

Figure 17:
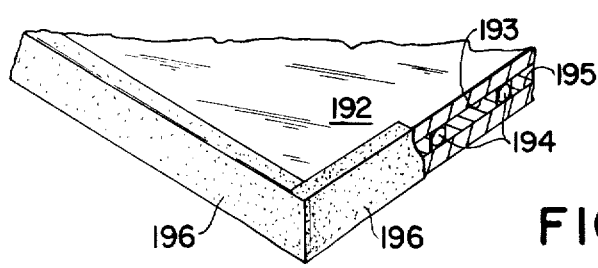
FIG. 17 is an enlarged perspective view in accordance with the present invention showing the edges of the wire reinforced paper structure taped with a water resistant tape.

Furthermore, according to another aspect of the present invention, water resistant compositions, such as for example, rubber latex compositions, may be used as the adhesive. This is particularly advantageous in that it affords a greatly simplified procedure for producing a waterproofed (as opposed to simply water resistant) cardboard structure. Presently, to produce a waterproofed structure, it is necessary to wax the cardboard or cover the interior of the cardboard with a polyurethane film. However, these steps are not necessary if a rubber latex adhesive composition is utilized in producing the laminated paper structures in accordance with the present invention. Instead, by having three individual paper layers laminated together, the rubber latex composition applied between each of the paper layers is adhered, as at 193, 195 of FIG. 17, on both sides of the middle paper layer. In this way, the rubber latex composition completely encloses the middle paper layer of a laminated paper structure with the exception of the exposed edges. The resulting paper laminate can then be completely waterproofed simply by taping the open edges of the laminate. Such a structure is shown in FIG. 17 in which a wire reinforced laminate 192 having wires 194 disposed in channels in the middle paper layer has been taped about its edges with a water resistant tape 196. Water or other moisture will be unable to permeate through the rubber latex composition (or the tape on the edges) thereby insuring the integrity of the middle paper layer against the adverse effects of moisture. In this regard, it is to be noted that it is the middle paper layer which has the reinforcing wires therein. Thus, the structural strength of the wire reinforced paper laminate will be substantially maintained, as a result of the reinforcing wires, even if the outer paper layers of the laminate soften as a result of moisture.

Examples of rubber latex compositions which will afford these features in accordance with the present invention include the following: AMSCO RES 4125 (a soft carboxylated styrenebutadiene copolymer having 49% solids); Basic Adhesives, Inc., BR-989 (a flexible resin-based adhesive), and Basic Adhesives, Inc., BL-986 (a latex-based adhesive). It is to be noted that with use of these rubber latex compositions, a heated roller or oven for setting/drying is optional as these rubber latex compositions are all water emulsions. In other words, they do not require heating for setting. However, use of a heated roller or over will result in drying of the adhesives more quickly. Water resistant tapes for taping the edges of the paper laminate are well known. For example, paper type tapes which could be utilized include Scotch Brand 217 and Scotch Brand 260. Further, plastic type tape of mylar or acetate could be utilized as well as tapes of other types of suitable plastic. These plastic type tapes may or may not be filament reinforced.

Wire thickness, of course, may vary depending on the structural strength required. It has generally been found that wire elements 52 or 150 of the order of 5–25 mils in diameter are most effective. Various thicknesses of paper webs may be used, though generally it is not necessary to exceed a 26 pound paper in order to achieve an extremely high degree of strength with wire thicknesses as small as 5 mils. It is obvious, however, that when extremely light board is required, lighter paper and thinner wire can be utilized.

As previously mentioned, the spacing between the wire elements 52 or 150 in the middle layer of web of paper may be almost any desired spacing, but is preferably on the order of from ⅛ to ½ inch. In the embodiments shown in FIGS. 1–16, ¼ inch spacing has been used and wire thicknesses of 10 mils has been shown.

Figure 18:
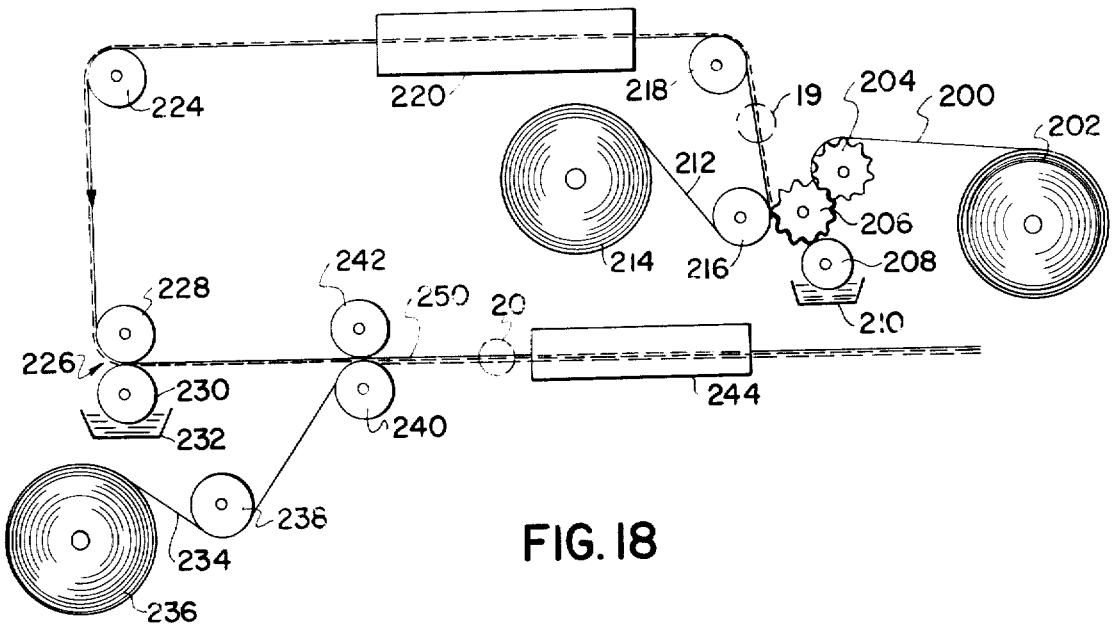
FIG. 18 is a diagramatic view of the apparatus for producing a wire reinforced corrugated material in accordance with the present invention.

As noted previously, the wire reinforced paper structure wound up on the take-up rolls 84 or 190 may be used for any desired purpose where increased structural strength of a paper product is desired. In particular, this wire reinforced paper laminate is especially useful in producing corrugated board of the type in which the facings or liners are adhered to the crest portions of each side of the corrugated medium. FIG. 18 illustrates an embodiment of the invention for forming such corrugated board which is generally known as double-faced corrugated board. For purpose of illustration, this embodiment of the invention utilizes only a single wire 52 in each of the channels 31 formed in the middle layer 30 of the wire reinforced laminate according to the present invention. However, it is to be understood that arrangements of double wire or even a greater number of wires may be utilized in order to obtain a desired strength and rigidity of the resultant corrugated board. Further, it is to be noted that the wire reinforced paper laminate of the present invention can be used as the outer facings or liners of the double-faced corrugated board if desired. However, in many applications, it has been found that merely providing adequate reinforcement of the corrugated medium will provide the desired degree of rigidity, while in other applications where a higher degree of rigidity is desired, all three layers need to be reinforced with wires.

Figure 19:
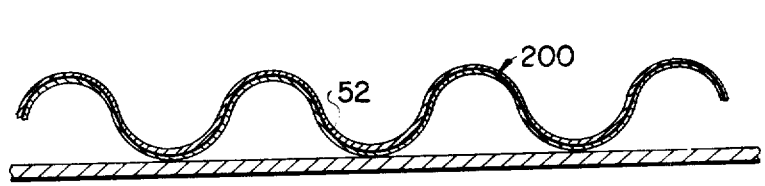
FIG. 19 is a greatly enlarged cross-sectional view at position 19 of FIG. 18 showing the corrugated wire reinforced paper structure adhesively secured to one outer facing or liner.

More specifically, and with reference to FIG. 18, a reinforced laminate 200, such as one of the laminates produced by the structure shown in FIG. 1, is fed from a roll 202 about a pair of corrugating rollers 204 and 206. The corrugating rollers 204 and 206 are standard corrugating rollers which serve to corrugate the wire reinforced laminate 200 transversely of the plurality of wires 52 in the channels 31. An adhesive is applied to the corrugated laminate by a roller 208 immersed in an adhesive filled trough 210. A second paper layer 212, which in the embodiment shown in FIG. 18 merely comprises a paper web, is fed from a roll 214 and about a roller 216 which bears against the corrugating roller 206 and in so doing produces a structure such as shown in FIG. 19. It will be observed that this structure shown in FIG. 19 is greatly enlarged for purposes of clarification. The corrugated structure or medium 200 with the paper layer 212 applied to the crest portions of one side thereof then passes about roller 218 whereupon it is fed through a suitable oven 220 to evaporate the liquid and cure the adhesive.

The corrugated structure 200 with the layer 212 applied to one side thereof is then fed about the roller 224 to the adhesive applying station 226 consisting of a roller 228 and an adhesive applying roller 230, the latter being immersed in an adhesive containing trough 232. This adhesive applying station 226 applies adhesive to the crest portions of the other side of the corrugated laminate structure 200.

A third paper layer 234, which in the embodiment shown is identical to the lower layer or web 212, is fed from a roll 236 and about rollers 238 and 240, the latter being in contact with the corrugated layer or medium 200 as it immerges from the adhesive applying station 226. A back-up roller 242 cooperates with the roller 240 to insure firm contact of the layer or web 234 with the corrugated layer 200. The resultant structure 250 comprising the corrugated medium 200 with upper and lower facings or liners 212, 234 on each side thereof then passes through a second oven 244 to evaporate liquid and cure the adhesive applied at the adhesive applying station 226. The resulting structure 250 is shown in cross-section in FIG. 20 which has been greatly enlarged for purposes of clarification.

Figure 20:
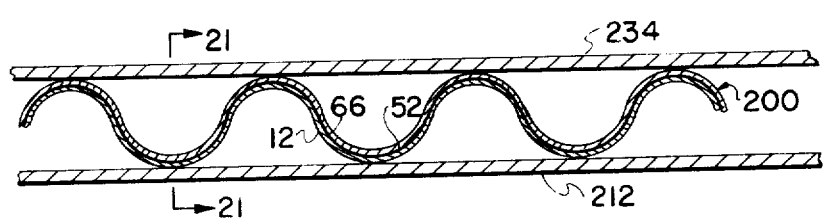
FIG. 20 is a greatly enlarged cross-sectional view, similar to that shown in FIG. 19, taken at position 20 of FIG. 18 showing the wire reinforced corrugated paper structure adhesively secured between two outer facings or liners to form double-faced wire reinforced corrugated board in accordance with the present invention.
Figure 21:
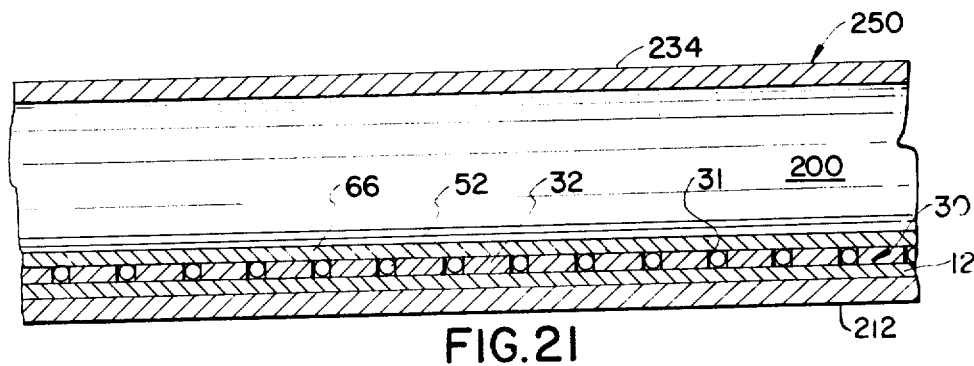
FIG. 21 is a cross-sectional view taken along lines 21—21 of FIG. 20.

As seen in FIGS. 20 and 21, the corrugated medium 200 of the corrugated board 250 is a laminate structure according to the present invention comprised of three layers of paper 12, 30, 66 with wires 52 set in trenches or channels 31 in the middle layer 30. In the particular embodiment shown in FIGS. 20 and 21, each of the three paper layers 12, 30, 66 forming the laminate structure is 10 mils in thickness, as is the wires 52 set in the channels 31. The upper and lower facings or liners 212, 234 are simply paper webs in the shown embodiment which are each of 20 mils in thickness.

It is to be noted that with a ¼ inch spacing between the wires 52 in the corrugating medium 200 of the board 250, and with the use of standard corrugating rollers 204, 206 to produce the corrugations in which there are approximately 5 steel arches per one inch of length, there are over 3,000 steel arches in a single square foot of corrugated board.

Figure 22:
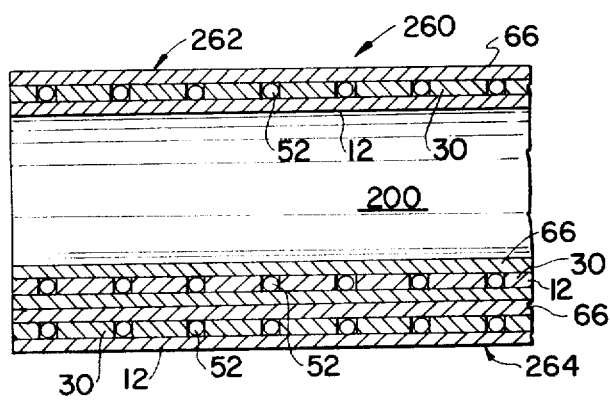
FIG. 22 is a cross-sectional view, similar to that shown in FIG. 21, in which the wire reinforced paper structure of the present invention is used in the outer facings or liners of the double-faced corrugated board as well as in the corrugated medium.
Figure 24:
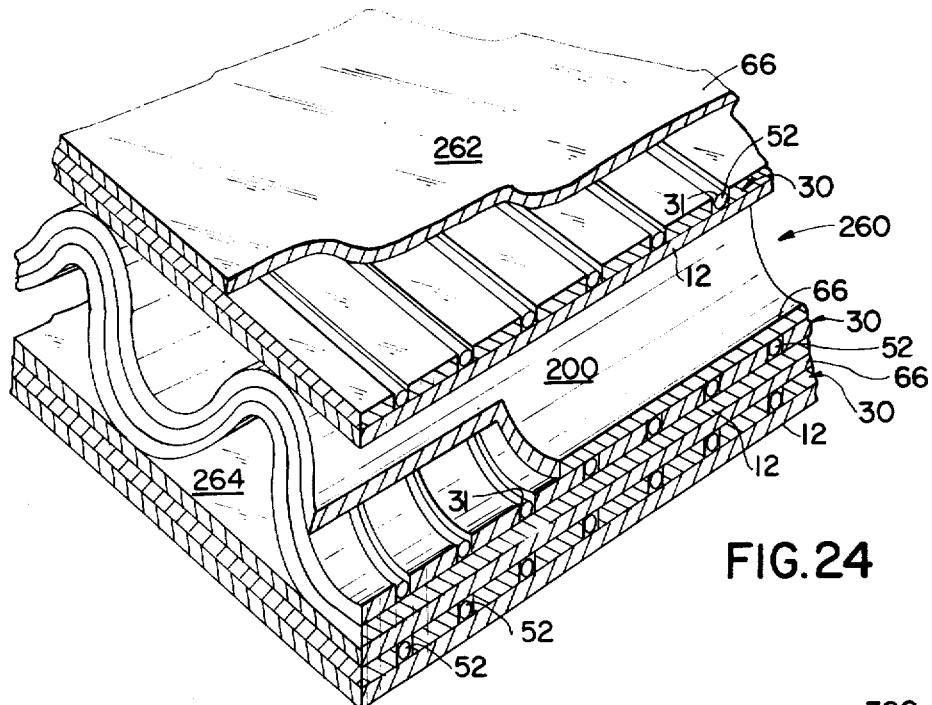
FIG. 24 is an enlarged perspective view, partly in section and partly broken away, showing double-faced wire reinforced corrugated board in accordance with the present invention.

FIG. 22 and 24 show an alternative form of double faced corrugated board 260 in which a wire reinforced laminate similar to laminate 90, is used for both the top and bottom liners or facings 262, 264 adhered to the crest portions of each side of the corrugating medium 200. Thus, there are three wire reinforced laminate webs making up the structure shown in FIGS. 22 and 24.

Figure 23:
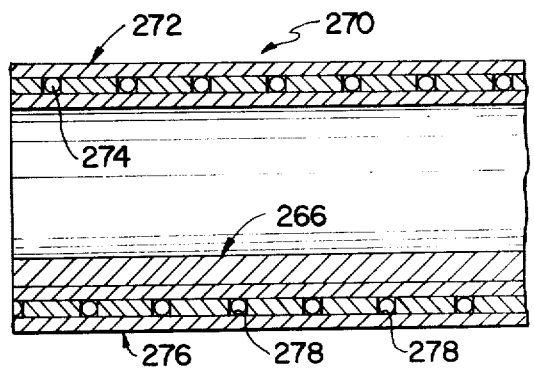
FIG. 23 is a cross-sectional view, similar to that shown in FIGS. 21 and 22, but with the wire reinforced paper structure of the present invention only being used in the outer facings or liners of the double-faced corrugated board.

FIG. 23 shows another alternative form and use of the wire reinforced laminate structure in that a 20 mil thick paper web 266 is used as a corrugating medium of a double face corrugated board 270, and wire reinforced laminates, similar to laminate 90, form the upper and lower facings 272, 276. While such an arrangement does not produce the strength of the boards 250 or 260, in which the wires 274, 278 are used for the corrugating medium 200, the board 270 shown in FIG. 23 does produce an increase in structural strength for the corrugated board.

It will be noted with reference to FIG. 23 that the wire reinforcing elements 274 in the upper facing 272 have been laterally or transversely off-set with respect to the wire reinforcing elements 278 in the lower facing 274. This is advantageous to provide an increased strength for the resulting double faced wire reinforced corrugated board 270 since it does not permit a puncturing element to pass clearly therethrough between wire reinforcing elements 274, 278. In essence, by laterally offsetting the wires such that the wire elements 278 of the lower facing 276 lie directly beneath the mid-point between the wire reinforcing elements 274 of the upper facing 272, an equivalent spacing which is one-half the actual spacing of the wires is achieved for the board 270. That is, if each of the wires in both the upper and lower facings 272, 276 is spaced ¼ inch from one another, then by off-setting the wires in the two facings 272, 276 so that the wires 278 of the lower facing 276 lie below and half way between the wires 274 of the upper facing 272, an equivalent spacing of ⅛ inch for wire reinforcing elements 274, 278 is achieved. It is to be noted that this same principle can also be applied with respect to the wire reinforcing elements of the corrugated medium where the corrugated medium is also wire reinforced.

To provide even further increased strength for a double faced corrugated board, and in particular to increase the structural strength of the outer facings or linings of the board, two sections of wire reinforced paper laminate, each produced in accordance with the present invention, can be laminated together so that the wire reinforcing elements of each of the two laminates are disposed perpendicularly to one another. That is, sections of wire reinforced laminate can in turn be laminated in series to a second wire reinforced laminate web so that one set of wire reinforcing elements is disposed transversely of the other set of wire reinforcing elements. In a sense, this forms a type of off-set wire mesh or grill, in the form of a grid, for the resulting laminate. As can be appreciated, the second set of reinforcing wires, transverse to the first set of wires, serves to increase the structural strength of the resulting grid type laminate.

Figure 25:
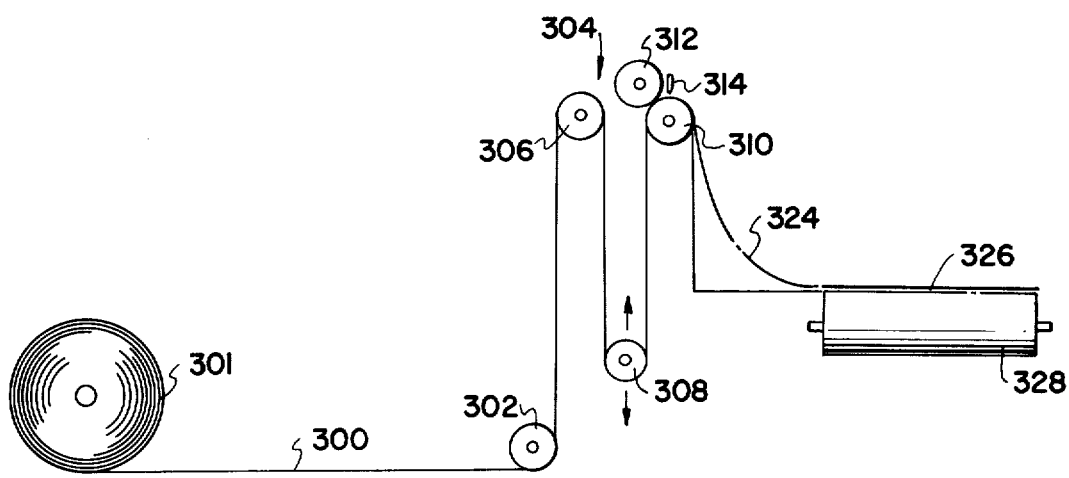
FIG. 25 is a diagramatic view of the apparatus for severing the wire reinforced laminate of the present invention into sections and placing the sections in side by side relationship with the reinforcing elements disposed transversely of the direction of the movement of the severed sections.
Figure 26:
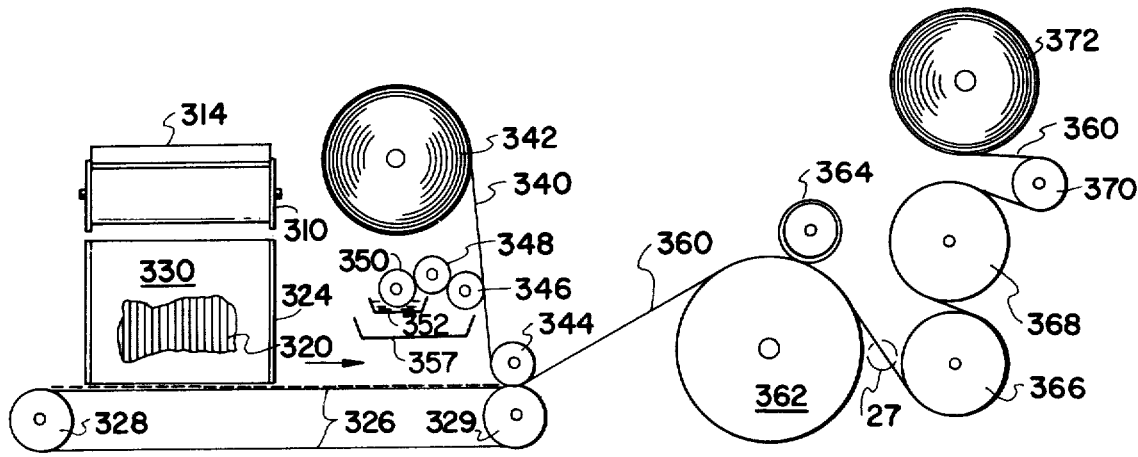
FIG. 26 is a diagramatic view of the apparatus for laminating the sections produced in accordance with the apparatus of FIG. 25 to a web of wire reinforced paper laminate to form a structure having longitudinal and transverse reinforcing elements incorporated therein.

Referring now to FIGS. 25 and 26, there is disclosed apparatus for producing such a grid type reinforced paper laminate in which the wire reinforced elements are disposed both transversely and longitudinally with respect to the resulting laminate web. Initially, wire reinforced laminate 300, such as, for example, that produced in accordance with FIGS. 1-8, is fed from a drum 300 about roller 302 to a web length and tension compensator generally denoted by the numeral 304. The compensator 304 includes a roller 306 about which the web 300 passes, a dancer roller 308 which is arranged to move vertically, and a cutter roller 310. A pressure roller 312 bears against the cutter roller 310 to maintain the web 300 in contact at all times with the cutter roller 310. A cutter blade 314 is periodically reciprocated to sever the web 300 in precise lengths. In the instant embodiment of the invention, the web 300 with the wires 320 disposed in the channels in the middle paper layer is severed into lengths equivalent to the width of the web 300 and each severed length is guided downwardly by a chute 324 onto a belt 326 carried by roller 328. This speed of the belt 326 and the speed at which the web 300 is transported are coordinated so that each severed web section 330 is positioned on the belt 326 in substantially contiguous relationship with the previous web section. To achieve this end, additional feed rollers may be employed if desired in order to insure proper movement of each severed web section 330 onto the belt 326. If desired, the severed web sections 330 may also be stacked for processing at a later time.

Referring now to FIG. 26, it can be seen that the cut-off roller 310 and the chute 324 are illustrated in elevation and that the belt 326 is carried by rollers 328, 329. It will be observed that each of the severed sections 330 is now positioned in contiguous relationship with the preceding section on the belt 326 and the wires 320 held in the channels in the middle layer are now disposed in transverse relationship with reference to the direction of the motion of the belt 326 and, thus, the severed sections 330. A second wire reinforced laminate web 340, again such as may have been produced in accordance with FIGS. 1-8, is fed from a drum 342 downwardly and about a pressure roll 344 which urges it against the severed sections 330 having the wire reinforcing elements thereof transversely disposed. A coating of adhesive is preferably applied to one side of the laminated web 340 by means of rollers 346, 348 and 350, the latter being partially immersed in a trough 352 containing an adhesive. A pan 357 is preferably disposed below the adhesive applying means in order to prevent adhesive from accidentally dripping upon the severed sections 330. The resulting laminate 360, consisting of a first laminate 330 having traversely disposed wires held in channels therein and a second laminate web 340 having longitudinally disposed wires in channels therein, is then fed about the roller 362 having a cooperating pressure roller 364. The pressure roller 364 has a resilient surface in order to urge the unsevered paper laminate 340 into firm contact with the severed sections 330 to firmly set and adhere the two wire reinforced paper laminate sections together. The completed laminate 360 then passes about rollers 366, 368, 370 and is wound up on a spool 372.

The adhesive utilized for adhering the second wire reinforced paper web 340 to the severed sections 330 of the wire reinforced paper laminate may be of any desired composition, for example, any of the adhesives mentioned hereinabove at pages 21-24. Normally, an adhesive is utilized which can be cured rapidly in the presence of heat and under those conditions it may be desirable to heat the roller 362 in order to rapidly cure the adhesive. In that instance, the rollers 366 and 368 may then be in the form of cooling rollers in order to bring the laminate to approximately room temperature prior to rolling onto the spool 372. Alternatively, if a rubber latex adhesive compound is utilized to produce a waterproofed paper laminate, as noted above, heating of the roller 362 is not required for curing of the adhesive, but instead merely speeds up the drying process. It will also be understood that inasmuch as the severed sections 330 are placed on the belt 326 in contiguous relationship, it is not necessary to attach the sections 330 one to the other since they will automatically be adhered to the web 340, thus forming a continuous and substantially uninterrupted layer. Further, as can be appreciated, other methods for adhering sections of laminate transversely to a second laminate web may be utilized.

Figure 27:
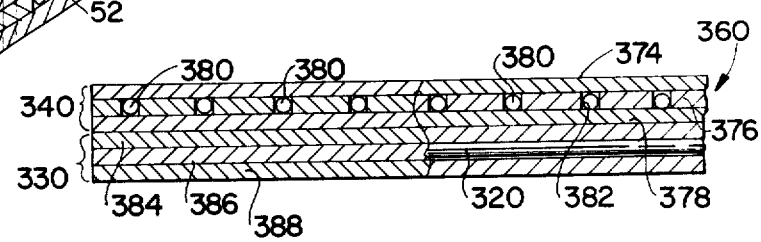
FIG. 27 is a greatly enlarged cross-sectional view at position 27 of FIG. 26 showing the laminated wire reinforced paper structure having longitudinal and transverse reinforcing elements incorporated therein.

The resultant grip type laminate 360 having a first laminate with wire reinforcing elements being longitudinaly disposed and a second layer with wire reinforcing elements transversely disposed can be seen in cross section in FIG. 27. As can be seen, the top layer (the laminate web 340) comprises a laminate of three paper sections 374, 376, 378 in which channels 382 are formed in the middle section 376 and into which channels 382 wire reinforcing elements 380 are disposed between the upper and lower paper sections 374, 378. This upper laminate 340 is adhesively secured to a second layer (the laminate sections 330), also comprised of three paper sections 384, 386, 388 adhesively secured together. Again, the middle layer 386 is provided with a series of channels into which wire reinforcing elements 320 are disposed. But in this instance, the elements 320 are disposed transversely of the wire reinforcing elements 380 of the upper laminate 340.

Figure 28:
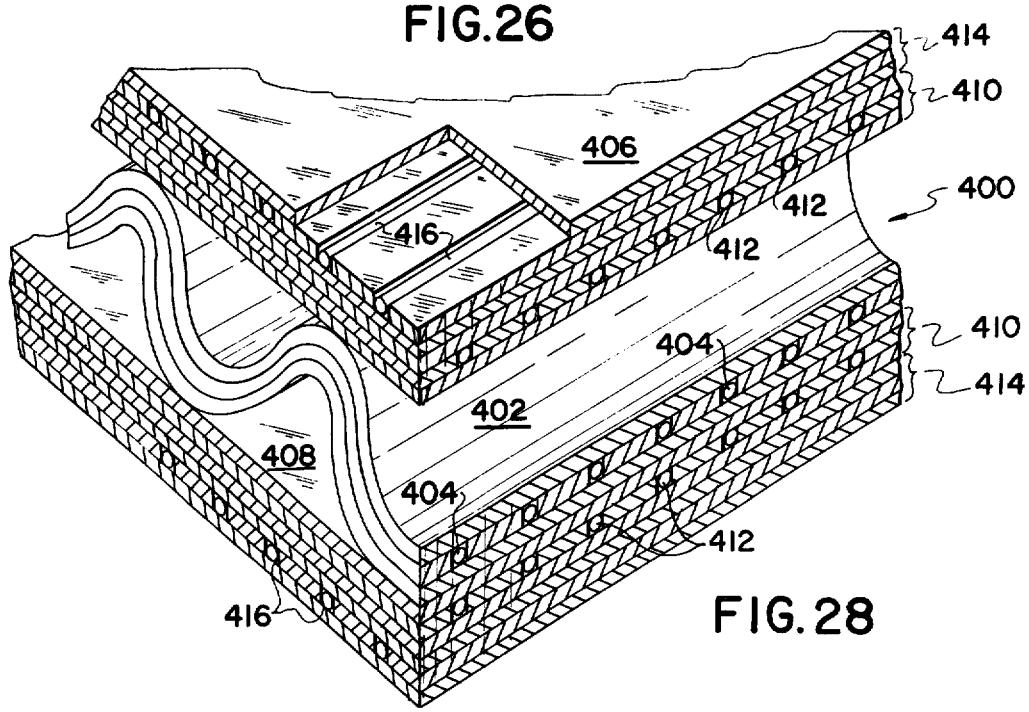
FIG. 28 is an enlarged perspective view, partly in section and partly broken away, showing double faced wire reinforced corrugated board in accordance with the present invention in which the laminated paper structure produced in accordance with FIGS. 25–27 forms the outer facing of the double-faced wire reinforced corrugated board.

By having both transversely disposed and longitudinally disposed wire reinforcing elements, an extra dimension of strength is added to the resulting paper laminate 360. In essence, the resulting laminate 360 forms an offset grid type structure in which only small, square-shaped areas of unreinforced paper exists, thus making for a stronger structure which will not puncture as easily. Such a grid type laminate 360 is particularly useful as the outer facings or linings of double faced wire reinforced corrugated cardboard. Thus, the resulting laminate 360 can be adhered, for example, with the apparatus as shown in FIG. 18, to each side of the crest portions of a wire reinforced corrugated medium. That is, referring to FIG. 18, the resulting grid type laminate 360 may be substituted for either or both of the laminates fed from spools 214, 236. Such a double faced corrugated cardboard structure in which a grid type laminate is used for both of the outer facings is shown in FIG. 28. there, it is seen that the double faced corrugated cardboard 400 comprises a corrugated medium 402 having wire reinforcing elements 404 disposed transversely to the corrugations, and two outer facings 406, 408 adhered to the crest portions of the corrugated medium 402. Each of these outer facings 406, 408 is comprised of a grid type laminate, one laminate 410 of which has wires 412 longitudinally disposed and the other laminate 414 of which has wires 416 transversely disposed.

As noted hereinabove, the use of a middle layer of paper which is notched or cut to produce a series of channels therein for wire reinforcing elements serves as a convenient spacing and holding medium and results in an improved wire reinforced laminate structure. In this regard, it will be appreciated that even though the cross-sectional area of the channels is greater than the cross-sectional area of the wires disposed therein, the width and depth of the channels correspond to the thickness of the wires disposed therein so that the wires are rigidly held in place and the outer facings are relatively smooth. This is advantageous as it will not greatly wear corrugating rollers or interfere with cutting operations. Further, adhesion of the various layers of paper is improved as well as adherence to other materials.

While only certain forms of the invention have been illustrated and described, it is understood that modification, changes and alterations may be made without departing from the spirit and scope thereof as defined by the appended claims.

What is claimed is:

1. A reinforced corrugated paper laminate comprising:
    a first paper layer having a plurality of spaced parallel channels formed on the surface of one face thereof, said channels being of a depth less than the thickness of said first paper layer;
    a plurality of longitudinal wires in said channels of said first paper layer, the depth of said channels corresponding to the thickness of said longitudinal wires disposed therein, and the width of each of said channels corresponding to the total thickness of said wires disposed therein, and said channels having a cross-sectional area greater than the cross-sectional area of said wires disposed therein;
    a second paper layer adhesively secured to said surface of said first paper layer having said channels formed thereon to hold said plurality of wires in place between said first paper layer and said second paper layer to form a wire reinforced paper laminate; and
    said wire reinforced paper laminate being corrugated transversely of said longitudinal wires.

2. The reinforced corrugated paper laminate of claim 1 further including at least one paper medium adhered to the crests of one side of the corrugated paper laminate.

3. The reinforced corrugated paper laminate of claim 1 further including first and second paper mediums forming the outer facings of a corrugated board, said first paper medium being adhered to the crests of one side of the corrugated paper laminate and said second paper medium being adhered to the crests of the other side of said corrugated paper laminate to form said corrugated board.

4. The reinforced corrugated paper laminate of claim 3 wherein at least one of said first and second paper mediums comprise a wire reinforced paper medium, each of said wire reinforced paper mediums being comprised of a third paper layer having a plurality of spaced parallel channels formed on the surface of one face thereof, said channels being of a depth less than the thickness of said third paper layer; a plurality of longitudinal wires in said channels of said third paper layer, the depth of said channels corresponding to the thickness of said longitudinal wires disposed therein, and the width of each of said channels corresponding to the total thickness of said wires disposed therein, and said channels having a cross-sectional area greater than the cross-sectional area of said wires disposed therein; and a fourth paper layer adhesively secured to said surface of said third paper layer having said channels formed thereon to hold said plurality of wires in place between said third paper layer and said fourth paper layer.

5. The reinforced corrugated paper laminate of claim 4 wherein both of said first and second paper mediums are wire reinforced paper mediums.

6. A reinforced corrugated board comprising:
a first paper medium, said first paper medium being corrugated to form the corrugating medium of said corrugated board;
a second paper medium forming an outer facing of said corrugated board, said second paper medium being adhered to the crests of one side of said corrugated first paper medium to form said corrugated board; and
at least said first paper medium being a wire reinforced medium, each wire reinforced medium being comprised of a first paper layer having a plurality of spaced parallel channels formed on the surface of one face thereof, said channels being of a depth less than the thickness of said first paper layer; a plurality of longitudinal wires in said channels of said first paper layer, the depth of said channels corresponding to the thickness of said longitudinal wires disposed therein and the width of each of said channels corresponding to the total thickness of said wires disposed therein, and said channels having a cross-sectional area greater than the cross-sectional area of said wires disposed therein; and a second paper layer adhesively secured to said surface of said first paper layer having said channels formed thereon to hold said plurality of wires in place between said first paper layer and said second paper layer.

7. The reinforced corrugated board of claim 6 wherein said first paper medium is corrugated transversely of said longitudinal wires.

8. The reinforced corrugated board of claim 6, further including a third paper medium adhered to the crests of the other side of said corrugated first paper medium to form a double walled reinforced corrugated board.

9. The reinforced corrugated board of claim 8, wherein at least one of said second and third paper mediums is a wire reinforced medium.

10. The reinforced corrugated board of claim 9, wherein said second and third paper mediums are wire reinforced mediums.

11. The reinforced corrugated board of claim 10, wherein said first wire reinforced paper medium is corrugated transversely of said longitudinal wires.

12. The reinforced corrugated board of claim 10, wherein said second paper medium and said third paper medium each comprise first and second wire reinforced mediums laminated together, said first wire reinforced medium having said longitudinal wires thereof running in a first direction and said second wire reinforced medium having said longitudinal wires thereof running in a second direction, said second direction being at 90° relative to said first direction.

13. The reinforced corrugated board of claim 10, wherein said wires of said wire reinforced medium forming said second paper medium and said wires of said wire reinforced medium forming said third paper medium run in the same direction, and wherein said wires of said second paper medium are laterally offset with respect to said wires of said third paper medium so that said wires of said second paper medium overlie the spaces between said wires of said third paper medium.

14. The reinforced corrugated board of claim 10, wherein said wires of said wire reinforced medium forming said second paper medium and said wires of said wire reinforced medium forming said third paper medium run in the same direction, and wherein said wires of said second paper medium are aligned with said wires of said third paper medium so that said wires of said second paper medium overlie said wires of said third paper medium.

15. The reinforced corrugated board of claim 6, wherein the width of said channels of each said wire reinforced medium corresponds to the thickness of said wires disposed therein and wherein only one wire is in each of said channels.

16. The reinforced corrugated board of claim 6, wherein a plurality of wires are in side-by-side relationship in each of said channels of said wire reinforced medium.

17. The reinforced corrugated board of claim 6, wherein said first paper layer of each said wire reinforced medium comprises a paper web and a plurality of spaced parallel strips adhesively secured to said paper web, said paper strips being parallel to one another and spaced so that the spacing between adjacent strips defines said channels.

18. The reinforced corrugated board of claim 17, wherein each said wire reinforced medium includes a water resistant adhesive securing said plurality of strips to said first paper web and securing said second paper layer to said plurality of strips, and further includes edge sealing means for sealing the edges thereof with a water resistant material so that said plurality of paper strips is completely protected from moisture by said water resistant adhesive and said edge sealing means.

19. The reinforced corrugated board of claim 9, wherein said at least one of said second and third paper mediums which is a wire reinforced medium comprises first and second wire reinforced mediums laminated together, said first wire reinforced medium having said longitudinal wires thereof running in a first direction and said second wire reinforced medium having said longitudinal wires thereof running in a second direction, said second direction being at 90° relative to said first direction.

20. The reinforced corrugated board of claim 9 wherein said at least one of said second and third paper medium which is a wire reinforced paper medium comprises a double wire reinforced paper medium in which said first paper layer has said plurality of spaced parallel channels on the surface of one face thereof extending in a first direction so that said plurality of wires in said channels of said first paper layer extend in said first direction, and in which said second paper layer adhesively secured to said surface of said first paper layer includes a plurality of spaced parallel channels formed on the surface of one face thereof which extend in a second direction transverse to said first direction and further includes a plurality of wires in said channels of said second paper layer so that said wires in said channels of said first layer extend transversely of said wires in said channels of said second paper layer.

21. The reinforced corrugated board of claim 20 further including a third paper medium adhered to the crests of the other side of said corrugated first paper medium, and wherein both of said second and third paper mediums are double wire reinforced paper mediums.

22. A method of manufacturing a corrugated reinforced paper laminate, comprising the steps of:
forming a plurality of spaced parallel channels on the surface of a first layer of paper, the depth of said channels being less than the thickness of said first paper layer;
setting a plurality of longitudinal wires in said formed channels;
adhesively securing a second paper layer to said surface of said first paper layer having said channels formed thereon to hold said plurality of wires in place between said first and second paper layers to form a wire reinforced laminate; and
corrugating said wire reinforced laminate transversely of the longitudinal extent of said plurality of wires.

23. The method of manufacturing a corrugated reinforced paper laminate of claim 22, wherein the steps of forming a plurality of spaced parallel channels comprises adhesively securing a plurality of strips of paper onto a surface of a first paper web in spaced parallel relationship to thereby define said first paper layer, the spacing between said strips defining said plurality of spaced parallel channels.

24. The method of manufacturing a corrugated reinforced paper laminate of claim 23, wherein the step of forming a plurality of spaced parallel channels further comprises the step of cutting a plurality of spaced parallel notches in a second paper to form said strips of paper to be adhesively secured to a surface of said first paper web.

25. The method of manufacturing a corrugated reinforced paper laminate of claim 22, wherein the step of setting a plurality of longitudinal wires in said channels comprises setting one wire in ach of said channels.

26. The method of manufacturing a corrugated reinforced paper laminate of claim 22, wherein the step of setting a plurality of longitudinal wires in said channels comprises setting a plurality of wires in each of said channels.

27. The method of manufacturing a corrugated reinforced paper laminate of claim 26, wherein the step of setting the plurality of wires in each of said channels comprises setting two wires in each of said channels.

28. The method of manufacturing a corrugated reinforced paper laminate of claim 22, wherein the step of forming a plurality of spaced parallel channels comprises forming a plurality of channels, each of which has a depth corresponding to the thickness of one of said wires to be disposed in said channels.

29. A method of manufacturing a corrugated reinforced paper laminate comprising the steps of:
feeding a first paper web with an adhesive applied to one surface thereof;
feeding a plurality of spaced parallel papers strips into adhesive relationship with respect to said adhesively coated surface of said first paper web to form a paper laminate, the spacing between adjacent paper strips forming a plurality of spaced parallel channels in said laminate;
feeding a plurality of longitudinally extending wires into said plurality of spaced parallel channels in said paper laminate;
feeding a second paper web with an adhesive applied to one surface thereof into overlying relationship with said plurality of papers strips to entrap said plurality of wires between said first and second paper webs;
setting the adhesive on said first and second paper webs with said plurality of paper strips therebetween to form said wire reinforced paper laminate; and
corrugating said wire reinforced laminate transversely of the longitudinally extend of said plurality of wires.

30. The method of manufacturing a corrugated reinforced paper laminate of claim 29, wherein the step of feeding a first paper web comprises feeding said first paper web about a drum with adhesive applied to the surface of said first paper web facing outwardly away from said drum; and wherein the step of feeding a plurality of spaced parallel paper strips comprises feeding a plurality of paper strips onto said adhesively coated surface of said first paper web in spaced parallel relationship as said first paper web moves about said drum.

31. The method of manufacturing a corrugated reinforced paper laminate of claim 30, wherein the step of feeding a plurality of wires comprises feeding said wires into said channels as said paper laminate moves about said drum; and wherein the step of feeding a second paper web comprises feeding the adhesively coated surface of said second paper web onto said plurality of spaced parallel paper strips as said paper laminate with said wires in said channels moves about said drum.

32. The method of manufacturing a wire reinforced paper laminate of claim 30 in which said drum about which said first paper web is fed comprises a first drum and wherein the step of feeding a plurality of spaced parallel paper strips further includes, prior to said step of feeding said plurality of parallel paper strips onto said adhesively coated surface of said first paper web as said first paper web moves about first drum, the step of feeding a third paper web about a second drum and cuttng a plurality of spaced parallel notches in said third paper web as it moves about said second drum to form said plurality of spaced parallel strips.

33. The method of manufacturing a corrugated reinforced paper laminate of claim 29, wherein the step of feeding a plurality of spaced parallel paper strips comprises feeding a third paper web about a first drum, cutting a plurality of spaced parallel notches in said third paper web as it moves about said first drum to form said plurality of spaced parallel strips; and wherein the step of feeding a first paper web comprises feeding the adhesively coated surface of said first paper web onto said plurality of spaced parallel paper strips as said paper strips move about said first drum to form said paper laminate with said plurality of spaced parallel channels, and setting the adhesive on said first and third paper webs.

34. The method of manufacturing a corrugated reinforced paper laminate of claim 33, further including the steps of feeding said paper laminate from said first drum and feeding said paper laminte onto a second drum with said channels facing outwardly away from said second drum; wherein the step of feeding a plurality of longitudinally extending wires comprises feeding a plurality of wires into said channels as said paper laminate is moved about said second drum; and wherein the step of feeding a second paper web comprises feeding said second paper web onto said paper laminate with said wires therein as said paper laminate is moved about said second drum.

35. The method of manufacturing a corrugated reinforced paper laminate of claim 34, wherein the step of setting the adhesive on said first, second and third paper webs in firm contact with one another comprises heating said paper webs to dry the adhesive.

36. The method of manufacturing a corrugated reinforced paper laminte of claim 29, wherein the step of setting a plurality of longitudinal wires in said channels comprises setting one wire in each of said channels.

37. The method of manufacturing a corrugated reinforced paper laminate of claim 29, wherein the step of setting a plurality of longitudinal wires in said channels comprises setting a plurality of wires in each of said channels.

38. The method of manufacturing a corrugated reinforced paper laminate of claim 37, wherein the step of setting the plurality of wires in each of said channels comprises setting two wires in each of said channels.

* * * * *